United States Patent [19]

Leibowitz et al.

[11] Patent Number: 4,478,553
[45] Date of Patent: Oct. 23, 1984

[54] ISOTHERMAL COMPRESSION

[75] Inventors: Herman M. Leibowitz, Schenectady; Somayajulu D. S. R. Karamchetty, Latham, both of N.Y.

[73] Assignee: Mechanical Technology Incorporated, Latham, N.Y.

[21] Appl. No.: 363,156

[22] Filed: Mar. 29, 1982

[51] Int. Cl.³ .................... F01D 5/08; F02B 47/02
[52] U.S. Cl. .................... 416/97 R; 60/39.53; 60/728; 415/115; 415/116
[58] Field of Search .......... 416/97 R, 97 A, 181; 60/728, 39.05, 39.53, 39.55; 415/115, 116, 117, 114

[56] References Cited
U.S. PATENT DOCUMENTS

| | | | |
|---|---|---|---|
| 3,434,654 | 3/1969 | Feller | 416/97 |
| 3,657,879 | 4/1972 | Ewbank et al. | 60/39.05 |
| 3,841,786 | 10/1974 | Florjancic | 416/97 |
| 4,281,511 | 8/1981 | Neale | 60/728 |

FOREIGN PATENT DOCUMENTS 2925091 1/1981 Fed. Rep. of Germany ........ 60/728

Primary Examiner—Carlton R. Croyle
Assistant Examiner—Jeffrey A. Simenauer
Attorney, Agent, or Firm—Joseph V. Claeys; Arthur N. Trausch, III

[57] ABSTRACT

A compression intensified thermodynamic gas process that includes a compressor rotor having a series of passage forming blades between which a process gas is conducted during compression. A coolant metering system is contained within the rotor structure which is arranged to introduce a liquid coolant directly into the gas flow as the gas is being compressed. Coolant nozzles are strategically positioned throughout the rotor so that coolant droplets that are introduced into the flow stream will pass freely out of the rotor without impacting the rotor blades.

8 Claims, 5 Drawing Figures

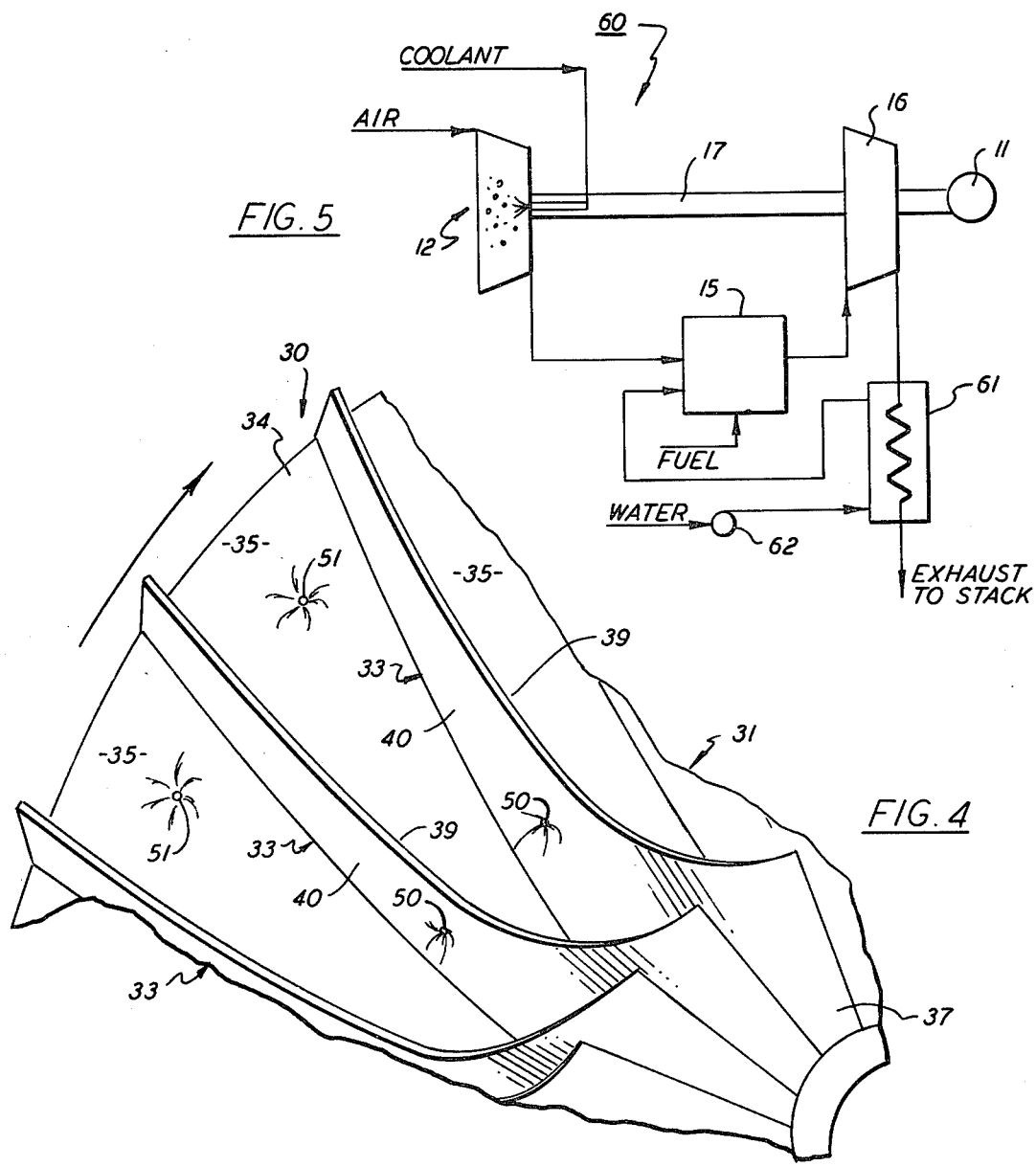
FIG. 5
FIG. 4
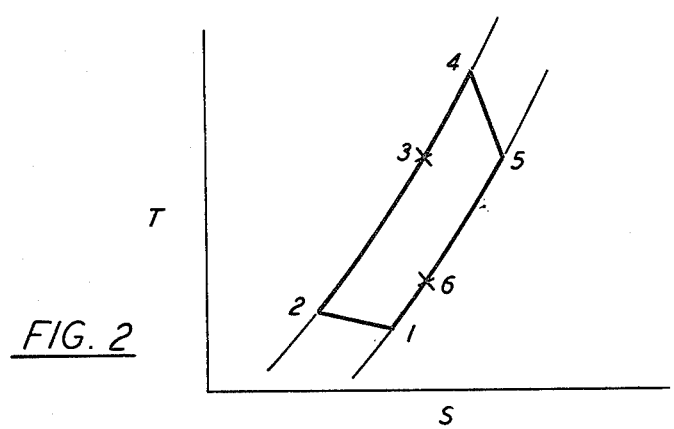
FIG. 2

ISOTHERMAL COMPRESSION

BACKGROUND OF THE INVENTION

This invention relates to an improved thermodynamic gas cycle and, in particular, to a compression intensified gas cycle that employs intrastage compressor cooling.

This invention relates more specifically to an improved rotary compressor that is suitable for use in a wide range of gas cycle applications wherein the pressure of the process gas is to be efficiently conducted to a higher state. Processes for transmitting gases through pipelines over relatively long distances and gas engines using the Brayton cycle are examples of two such applications. Many attempts have been made to increase the efficiency of compressors used in these processes. The aerodynamic efficiency of the compressor is oftentimes enhanced by staging the compressor and water cooling the process gas between each stage. Although interstage cooling is effective, it requires the use of relatively complex and thus expensive heat exchangers and the movement of large quantities of water over the heat exchange surfaces. This, in turn, produces parasitic pumping losses and an unwanted pressure drop over the exchanger or exchangers.

It is also well known that the burners used in a Brayton gas process develop harmful nitrogen oxides that are oftentimes discharged into the atmosphere. Equipment for controlling this type of dirty gas emission is relatively expensive and therefore anything that can be done to provide for a cleaner burning mixture in the burner section will be reflected in a reduction in equipment cost.

SUMMARY OF THE INVENTION

It is therefore an object of the present invention to improve compression intensified thermodynamic gas processes.

It is a further object of the present invention to reduce the amount of compressor work in a thermodynamic gas process.

A still further object of the present invention is to improve the Brayton gas cycle.

Another object of the present invention is to suppress the nitrogen oxides discharged from the burner of a Brayton engine.

Yet another object of the present invention is to provide intrastage cooling in a rotary compressor.

A still further object of the present invention is to reduce equipment costs in a compression intensified dynamic process.

These and other objects of the present invention are attained in a compression intensified thermodynamic process by means of a rotary compressor that includes a series of blades that coact to establish flow passages therebetween through which a process gas is conducted as the rotor is turned to compress the gas. A coolant metering system is contained within the rotor structure that sprays a fine mist of liquid coolant directly into the gas flow during compression. The coolant discharge nozzles are strategically positioned and designed within the rotor structure so that the coolant droplets are carried out of the blade passages without striking the rotor. In addition, the coolant, in the form of a finely dispersed mist, consists of droplets so small that any collision that does take place will have little or no effect on the structure.

BRIEF DESCRIPTION OF THE DRAWINGS

For a better understanding of the present invention as well as other objects and further features thereof, reference is had to the following detailed description of the invention which is to be read in conjunction with the accompanying drawings, wherein:

FIG. 2 is a T-S diagram outlining the thermodynamic cycle employed in the process illustrated in FIG. 1;

FIG. 4 is a partial view in perspective of the compressor rotor illustrated in FIG. 3 showing the location of coolant discharge nozzles contained therein; and FIG. 5 is a diagram similar to that shown in FIG. 1 illustrating another Brayton gas process utilizing the teachings of the present invention.

DESCRIPTION OF THE INVENTION

Figure 1:
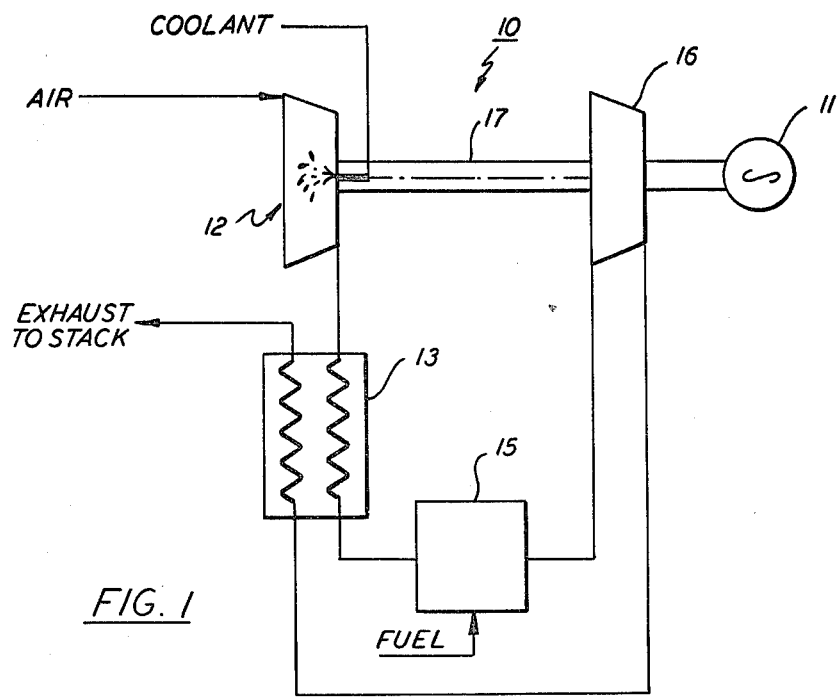
FIG. 1 is a diagram of a Brayton gas process embodying the teachings of the present invention.

Turning initially to FIG. 1, there is shown a thermodynamic gas process, generally referenced 10, that employs the well known Brayton air cycle in a power plant application to drive an electric generator 11 and thus produce useful work. Although the present invention will be explained in association with a power plant application it should be clear to one skilled in the art that the invention can be similarly employed in a wide range of compression intensified processes.

Ambient air is drawn into a rotary compressor 12, which is preferably a centrifugal compressor, and the air is compressed to a higher pressure. As will be explained in greater detail below, a liquid coolant is sprayed directly into the air flow being conducted through the rotor to reduce the temperature of the air while it is undergoing compression and thus considerably reduce the work of compression without a drastic increase in equipment cost. Compressed air discharged from the compressor is passed through a regenerator 13 and delivered to the intake of a burner section 15 of conventional design having one or more combustion chambers (not shown). A major portion of the compressed air flow is passed around the combustion chambers and is heated to a relatively high temperature. Some of the compressed air is mixed with fuel in the chambers to support combustion. High temperature air leaving the burner is passed into an expander 16 and utilized to drive the output shaft 17.

High temperature air exhausted from the expander is supplied to the regenerator where it is used to heat the compressed air prior to its entering the burner section. Cooled air leaving the regenerator is exhausted to atmosphere through a stack which again is not shown.

As illustrated in FIG. 1, the output shaft 17 of the expander is coupled directly to the generator load 11 and the compressor 12. In ordinary power plant applications the work of the expander is great enough to drive the compressor while at the same time delivering sufficient brake work to also drive the generator.

As shown on the T-S diagram illustrated in FIG. 2, ambient air is delivered to the compressor at state point 1. In the rotor, the air is compressed to state point 2 along a path that approaches an isothermal process which is quite a departure from the isentropic process normally associated with this type of system. The compressed air is then passed through the regenerator where its temperature is raised at constant pressure to state point 3. As can be seen, this rise in temperature is accomplished without an added input to the system. The regenerated air now enters the burner where a portion of the air is mixed with fuel and the mixture burned to raise the temperature of the remaining air to state point 4. The high temperature air is expanded isentropically through the expander and discharged at state point 5. As noted, temperature level at this point is considerably higher than that at the compressor discharge and, as a result, energy can be transferred effectively in the regenerator to raise gas temperatures before combustion. The air leaves the regenerator at state point 6 and is passed through the stack to atmosphere thereby completing the cycle.

The successful operation of the above noted cycle is dependent to a large extent upon the use of the isothermal compressor which greatly reduces the amount of work that the compressor is required to deliver. Attempts have been made to obtain isothermal compression in rotary machines; however, these attempts have met with only limited success due to the complexity of the coolant admission schemes and the inability to introduce a coolant into the rotating frame of the compressor without causing severe damage due to blade impact and erosion. As will become evident from the disclosure below, the present design takes into consideration the dynamic behavior of the liquid coolant that is introduced into the compressor so that the fine mist transverses the blade passages without striking the rotor components.

Figure 3:
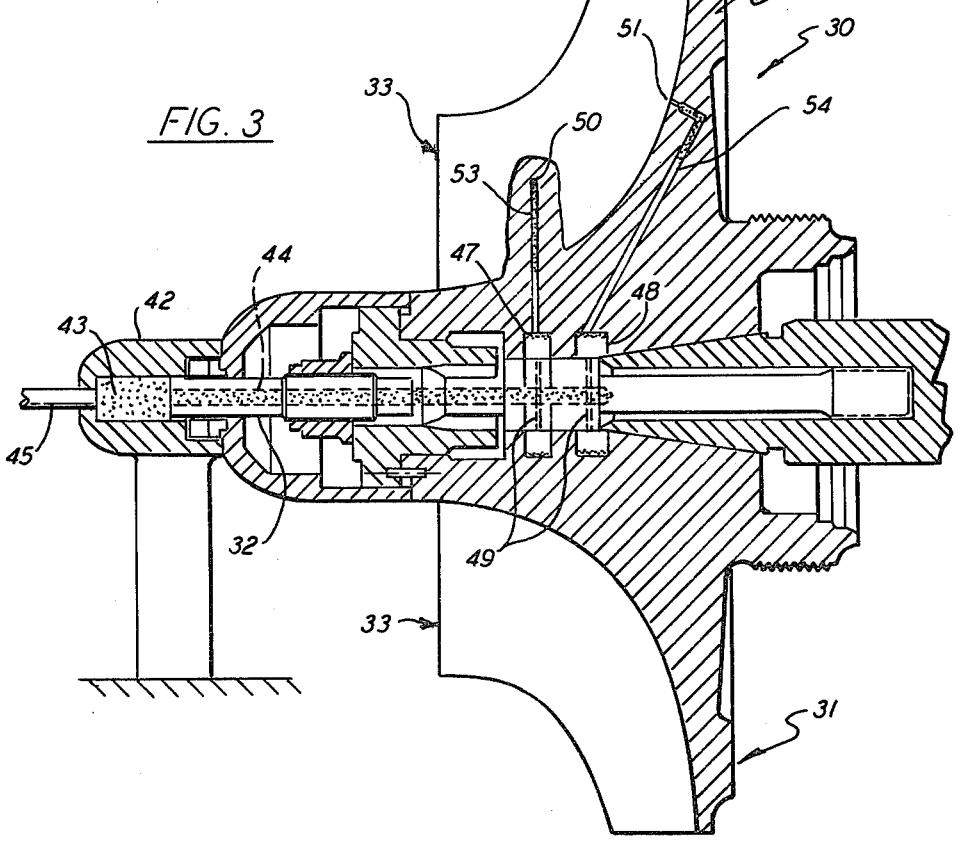
FIG. 3 is a side elevation in section showing a compressor rotor utilized in the process of FIG. 1.

Turning now to FIGS. 3 and 4, there is shown a centrifugal compressor generally referenced 30 that embodies the teachings of the present invention. The compressor includes an impeller or rotor section 31 that is mounted for rotation upon a shaft 32 that is in turn driven by the output shaft 17 of the expander. The impeller is provided with a series of contoured blades 33—33 that coact with the back plate 34 of the impeller wheel to establish a plurality of flow passages 35—35 through which the process gas (air) is transported during compressions. The impeller is of conventional design wherein air enters the wheel at the eye 37 of the impeller and is turned by the blades into a radial path of travel. As the rotor turns in the direction indicated in FIG. 4, the air being conducted through the upper part of the blade passages is compressed.

Due to the high speed circular motion of the impeller wheel, the air moving through the blade forming flow passages is generally forced to the back side of the passage in reference to the direction of rotation. As a consequence, the front face 39 of each blade has a greater influence upon the flow than the back face 40 and the flow characteristics on the front or pressure side of each passage is different than that found on the back or suction side of the passage.

The rotor is an overhung type supported at the rear near the gearbox (not shown). Block 42 supports seals to keep the coolant within the shaft bore. A plenum chamber 43 is formed in the seal block that communicates directly with a main flow channel in the form of a central hole 44 machined along the axis of the rotor shaft. A coolant supply line 45 enters the front of the seal block and provides a continuous supply of liquid coolant to the plenum. A pair of annular chambers 47 and 48 are formed in the hub of the impeller wheel and communicate with the main flow channel by means of radial ports 49—49. Coolant delivered to the plenum passes along the shaft opening and is metered into the two rotor chambers via the metering ports.

A plurality of metering holes are formed in the impeller structure. The holes carry liquid coolant to a number of strategically located coolant nozzles 50 and 51 which introduce the coolant directly into the compressed air flow. A first flow metering circuit consisting of feed holes 53 is arranged to pass upwardly from the first annular chamber 47 into each of the impeller blade elements and provide flow circuits for bringing coolant to nozzles 50—50 (FIG. 4). A second set of holes 54 are arranged to pass upwardly from the second annular chamber 48 and provide similar flow circuits for bringing coolant to nozzles 51—51.

Through the construction of a thermodynamic model and tests conducted on an axial turbine, it has been found that the coolant can be introduced into the impeller flow passages under controlled conditions. Through proper location of the nozzle openings and the sizing of the metering holes, the coolant introduced into the compression flow traverses a prescribed path of travel that avoids impacting the rotor structure. Accordingly, blade erosion problems caused by the liquid coolant are minimized or eliminated while at the same time effective cooling of the air is produced.

In the present embodiment of the invention, the coolant that is employed is water. The water is metered through the flow circuits to each of the nozzle sets. Under the influence of the rotating impeller, operating at high rotational speeds, the pressure at each nozzle typically reaches several thousand pounds per square inch. As a result of this large pressure difference that exist between the coolant and the gas path, effective atomization is achieved as the coolant leaves the nozzles. Each nozzle is designed to achieve the desired pressure and flow rate. This results in the water being introduced into the blade passages in the form of a fine mist which quickly mixes with the compressed air. The water is thus evaporated in the blade passage and the latent heat of evaporation is utilized to produce the necessary cooling. Accordingly, a relatively small amount of coolant is consumed in the process which represents about ten percent by weight of the total compressor flow. Furthermore, since the water is the form of a fine mist, there is minimal erosion damage to the blades if collisions occur.

The droplet size of the coolant sprayed into the blade passage is preferably maintained between 2 and 10 microns. Larger droplet sizes can be tolerated in the system; however, this requires that extreme care be taken in the placements of the nozzles. The larger the droplet size, the closer the nozzles must be positioned to the outlet of the blade passage. This, however, reduces the residence time of each droplet in the passage and thus reduces the effectiveness of the coolant. Similarly, the larger size droplets reduces the evaporation rate and thus further reduces the effectiveness of the cooling process.

Preferably the nozzles associated with the blades, that is the nozzles referenced 50, should discharge coolant on the suction side of each blade passage and should be positioned above the axis of the impeller a distance that is equal to or greater than one half the radius of the wheel as measured over the blade tips. Liquid droplets in the preferred size range that are introduced into this section of the blade passage will follow a trajectory close to the suction side of the passage and thus flow out of the wheel without impacting the wheel structure. The nozzles 51 associated with the backplate of the impeller, because they are situated further away from the suction side of the passage, must be positioned higher up in the passage to prevent the coolant spray from impacting the impeller.

FIG. 5 illustrates a second power plant system 60 similar to that illustrated in FIG. 1. In this system the regenerator is removed and and evaporator unit 61 is added which aids in the combustion process. This system again utilizes an isothermal compressor 12 as described above which is coupled via shaft 17 to a power expander 16 and a load 11. The discharge of the expander, however, is passed through evaporator 61 where energy from the hot exhaust gas is used to produce steam. In operation, a supply of water is pumped into the evaporator by means of a pump 62 where the water is heated to steam. The steam is further pumped to the burner and injected into the combustion chamber to aid in the burning process. The addition of steam, among other things, considerably reduces the amount of nitrogen oxide generated during combustion and thus reduces the pollution level given off by the burner. It should also be noted that the air supplied to the burner from the isothermal compressor also contains a good deal of water. Because a portion of this air is used in the burning process, the production of unwanted oxides is further reduced without a serious increase in equipment cost.

While this invention has been described with reference to the details as set forth above, it is not limited to the specific structure as disclosed and the invention is intended to cover any modification or changes as may come within the scope of the following claims.

What is claimed is:

1. A high efficiency compressor for use in a compression intensified gas process that includes:
    an impeller having a series of radially extending blades affixed thereto that coact to form flow passages therebetween through which a process gas is conducted during the compression process;
    each blade having a front face and a back face and a blade tip;
    a driveshaft for rotating the impeller at a speed sufficient to compress the process gas conducted through said flow passages;
    each flow passage having a suction side and a pressure side;
    a coolant supply channel that passes axially through said shaft;
    a first coolant metering circuit passing radially outward through each of said impeller blades such that said first circuit communicates at said blade radially inner end with said supply channel and at said blade radially outer end with a first nozzle for introducing a coolant into one of said flow passages;
    each of said first nozzles positioned in said back face of said associated blade to discharge coolant into said suction side of an adjacent passages so as to transverse said flow passage, said first nozzles further sized and positioned to substantially avoid discharged liquid coolant from impinging on said blades and to cool the process gas in said flow passages; and
    a coolant supply means for introducing a liquid coolant into the said supply channel whereby coolant is metered through the said first circuit as said impeller rotates.

2. The compressor of claim 1, wherein each nozzle is positioned upon the associated blade of the impeller at a radial distance from the axis of the impeller that is at least equal to one half the overall radius of the impeller as measured over said blade tip.

3. The compressor of claim 2, that further includes a back plate on said impeller that encloses each of said flow passages and a second coolant metering circuit having a series of metering holes passing through said back plate, each metering hole communicating at one end with said coolant supply channel and at the other end with a second nozzle for introducing a coolant into one of said flow passages so as to transverse said flow passage.

4. The compressor of claim 3, wherein said second nozzles associated with said back plate are positioned a greater distance from the axis of the impeller than said first nozzles associated with the impeller blades.

5. The compressor of claim 4, wherein said first and second nozzles are positioned and sized to spray finely divided droplets of coolant in a range of 2 to 10 microns into said flow passages.

6. In a high efficiency rotary compressor having a plurality of radially extending, circumferentially spaced contoured blades connected to a back plate of an impeller wheel to form a plurality of gas flow passages and means for supplying a liquid coolant to said impeller wheel when said compressor is rotating, the improvement comprising:
    means for carrying a portion of said liquid coolant to a first discharge position on a back face of each blade;
    first nozzles at each first discharge positioned for discharging liquid coolant into a suction side of said gas flow passages so as to transverse said flow passages, said first nozzles further sized and position to substantially avoid discharged liquid coolant from impinging on said blades and to cool a process gas in said flow passages;
    means for carrying a remaining portion of said liquid coolant to a second discharge position on said back plate between each blade; and
    second nozzles at each second discharge position for discharging liquid coolant into said gas flow passages so as to transverse said flow passage.

7. The compressor set forth in claim 6, wherein said first and second nozzles are sized to create a large pressure difference between the pressure of the liquid coolant at the discharge positions and the pressure of the gas in the flow passages such that the liquid coolant is atomized as the coolant leaves the nozzles.

8. The compressor set forth in claim 7, wherein said first discharge position is at a radial distance from the axis of the impeller wheel equal to at least one half the overall radius of the impeller as measured over a blade tip and wherein said second discharge position is at a greater radial distance then said first discharge position.

* * * * *